_United States Patent Office_

3,041,345
Patented June 26, 1962

3,041,345
PROCESS OF PREPARATION OF ISONICOTINYL
HYDRAZONES AND HYDRAZIDES
Peter P. T. Sah, Davis, Calif., assignor to The Regents
of the University of California, Berkeley, Calif.
No Drawing. Filed July 22, 1959, Ser. No. 828,698
6 Claims. (Cl. 260—295)

This invention relates to methods for making new chemical compositions that not only possess a high degree of bactericidal effectiveness against micro-organisms, but which are further characterized by a remarkably low degree of toxicity. More particularly, this invention relates to processes for making new chemical compositions useful for combating, preventing the spread of, and, under proper conditions, eliminating tuberculosis in human beings and other animals.

This application is a continuation-in-part of my copending application Serial No. 382,838, filed September 28, 1953, now U.S. Patent No. 2,940,899, wherein the new compounds and methods of treating tuberculosis are disclosed and claimed.

The present invention is directed to methods of making these new chemical compounds, which have a high degree of bactericidal activity against micro-organisms, yet which are comparatively much less toxic than compounds previously used in treating diseases caused by such micro-organisms. Consequently, one object of the present invention is to produce new isonicotinyl hydrazones and their salts from the uronic acids, their salts and their lactones, these new compounds being not only bactericidal in their activity but also sufficiently non-toxic to permit their full use in utilizing this bactericidal activity against *Mycobacterium tuberculosis*.

Another object of the present invention is to produce new isonicotinyl hydrazones and their salts which achieve higher blood concentrations of an anti-tubercular agent than is possible with the free isonicotinic-acid hydrazide.

Another object is to produce new compounds for combating human tuberculosis that are so much less toxic than other known active compounds for this purpose as to permit their administration in bactericidal dosages.

Another object is to produce new compounds which may be given in sufficiently large doses to make them effective against advanced fibrotic types of tuberculosis.

Another object is to produce such compounds that have no appreciable effect in stimulating the central nervous system when used as a human medicament.

Another object is to produce bactericidal compounds that will act to diminish lung lesions and the volume of sputum resulting from tuberculosis in a human patient, and which will also render such sputum harmless due to the absence of live bacteria.

Another object is to produce an active antitubercular agent that will produce no harmful side effect in the patient or animal to whom it is administered.

Many other objects and advantages of the present invention will appear from the following description.

As has been noted, isonicotinic acid hydrazide is known to be a very active antitubercular agent but cannot be satisfactorily used as such due to its extreme toxicity and its tendency to stimulate the central nervous system. The present invention takes advantage of this activity by condensing the hydrazide with the d-uronic acids, their salts and their lactones, which are known detoxicating agents, to produce new isonicotinyl hydrazones, and salts thereof, having a chemically stable bond between the hydrazide and the carbonyl groups. These new hydrazones and their salts have exhibited excellent antitubercular characteristics when tested in vitro, in vivo, and clinically. Not only have these drugs demonstrated a marked activity against *Mycobacterium tuberculosis*, but the fact that the drugs have proved to be so much less toxic to humans than is the free hydrazide (i.e., the uncombined isonicotinic acid hydrazide) has permitted dosages of the new drugs in sufficient quantities to permit complete destruction of the bacilli in animals as well as in human patients.

Broadly, the new isonicotinyl hydrazones are prepared by dissolving the uronic acid or its derivative in a suitable solvent, such as water, methyl alcohol or ethyl alcohol, and adding the isonicotinic acid hydrazide. The reactants are then boiled a sufficient time to allow the condensation reaction to proceed to completion. The reaction mixture is then cooled to room temperature with the isonicotinyl hydrazones appearing as crystals within a relatively short time, i.e., 24 hours or less. The crystals are filtered from the solution and, preferably, are washed and finally dried by suction.

The following are illustrative examples of the preparation of some representative isonicotinyl hydrazones and salts thereof, using procedures that resulted in very high yields of the crystalline products obtained.

*Example 1*

One of the isonicotinyl hydrazones prepared from a lactone is d-glucuronolactone isonicotinyl hydrazone,

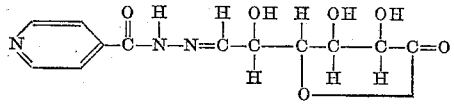

a new compound with comparatively low toxicity and very high antitubercular activity. This compound has been prepared as follows:

To 88 g. of d-glucuronolactone, in the bottom of a 3-liter round-bottom flask, were added 1.5 l. of methyl alcohol (acetone-free). The mixture was boiled gently on a steam bath for 10 minutes, producing a clear solution. To this hot solution, 70 g. of isonicotinic acid hydrazide were added all at once. The mixture was then boiled vigorously for 10 minutes and the clear solution filtered without suction through a piece of lens paper into a 2-liter Erlenmeyer flask. After the flask had been allowed to stand 24 hours at room temperature, crystals in the form of beautiful white rods and narrow plates were observed. These crystals were filtered with suction, washed with a small amount of methyl alcohol, and sucked to dryness. The resulting product was further dried in a vacuum desiccator for 3 days. Actual yield was 148 g., or a percentage yield of better than 99%.

On heating the d-glucuronolactone isonicotinyl hydrazone thus formed, the crystals charred and decomposed with foaming between 150° C. and 160° C., without any sharp melting point. The particular decomposition point depended on the rate of heating and the type of apparatus used. The new compound was readily soluble in water, from which it could not be recrystallized. It was practically insoluble in cold methyl or ethyl alcohol, but slightly soluble in boiling solutions of these solvents (100 cc. of methyl alcohol dissolved about 1.2 g. of the product at 65° C.).

The new compound thus formed was found by elemental analysis to be very pure, and upon recrystallization from a large amount of absolute methyl or ethyl alcohol showed no appreciable change in physical properties or analysis from the unrecrystallized product. If recrystallization is desired, the following procedure has been found highly satisfactory:

Heat one liter of reagent grade methanol to boiling in a 2-liter Erlenmeyer flask containing some boiling chips. Add, with stirring, 30 g. of glucuronolactone isonicotinyl hydrazone. When the solution is clear, or if no more is dissolving, add, with stirring, a suitable quantity of a decolorizing agent, such as one rounded teaspoonful of Norit A (activated carbon manufactured by American Norit Co.). Boil 3 minutes, filter rapidly by gravity through a preheated funnel into a 1.5-liter Erlenmeyer flask. Immediately cool the filtrate in ice water. Allow it to stand 4 hours, then filter off the precipitate and dry, first with suction and then in the vacuum desiccator.

*Example 2*

D-glucuronolactone isonicotinyl hydrazone has also been prepared from sodium d-glucuronate as follows:

D-glucuronic acid was liberated from a solution of its sodium salt (12.0 g.) in water (25 ml.) by the addition of concentrated hydrochloric acid (5 ml.). To the mixture, sodium acetate (5 g.) was added to remove the excess of the mineral acid. Isonicotinic acid hydrazide (7.0 g.) was then introduced into the clear solution and mixing accomplished by thorough shaking. Methyl alcohol (250 ml.) was added and the mixture boiled on a steam bath for 10 minutes. A white crystalline precipitate started to separate from the solution after a few minutes heating and was allowed to stand overnight at room temperature before filtering. The crystals (small white rods) were sucked to dryness, washed with a small amount of absolute methanol, and again sucked to dryness. The product was further dried in a vacuum desiccator for 24 hours. Yield: 25–50%. The hydrazone melted at 150° C.–160° C. (uncorrected), with charring and decomposition.

*Example 3*

Sodium d-glucuronate isonicotinyl hydrazone has been prepared by the addition of sodium hydroxide to a solution of d-glucuronolactone isonicotinyl hydrazone, as follows:

A suspension of 6.0 g. (20 mmol.) of d-glucuronolactone isonicotinyl hydrazone in 20 ml. of water was neutralized with 20 ml. of 1.0 N sodium hydroxide during which the pH of the system was prevented from rising above 9.5. The water was then removed by vacuum distillation at a bath temperature of 70° C. and a pressure of 40 mm. of mercury. The solid residue was boiled with absolute methanol, and filtered while hot. The filtrate was cooled to 4° C. and stored overnight at that temperature. A light yellow microcrystalline product weighing 1.5 g. was filtered off the next day.

*Example 4*

The sodium salt of d-glucuronolactone isonicotinyl hydrazone has also been prepared in the following manner:

A mixture of 9 g. of d-glucuronolactone isonicotinyl hydrazone and 30 ml. of water was neutralized, as in Example 4, using 30 ml. of 1.0 N sodium hydroxide, during which the pH was prevented from rising above 9.5. Vacuum distillation at 60° C. and 35 mm. mercury pressure removed the water, and the solid residue was extracted with two 120 ml. portions of boiling methanol. Each extract was filtered while hot, and the resulting filtrate cooled to 4° C. and maintained at that temperature overnight. From the first extract, 2.0 g. of light yellow crystals were obtained, and 0.5 g. were obtained from the second.

*Example 5*

The sodium salt of glucuronolactone isonicotinyl hydrazone has also been prepared by lyophilization:

A 12 g. quantity of glucuronolactone isonicotinyl hydrazone was suspended in 40 ml. of water at room temperature, and provision for continuous stirring and pH measurement was set up. The initial pH was 4.5. The suspension was neutralized with precisely one equivalent of sodium hydroxide per equivalent of the lactone, delivered dropwise from a buret, during which the pH was maintained below 8.5. The final pH was 8.8. Ice was used during the titration to keep the temperature at approximately 25° C. A clear amber solution was obtained after about one-half of the sodium hydroxide had been added.

Immediately after the titration, the solution was lyophilized in the usual manner. A light yellow, solid residue was obtained in an essentially quantitative amount. This product was freely soluble in water to give a solution having a pH of 8.5. When the compound was introduced into a Thiele apparatus at 140° C. and heated at a rate of 4° per minute, it decomposed with gas formation at 143° C.–145° C. (uncorrected) and charred at 147° C. (uncorrected). Analysis showed the theoretical amount of hydrolyzable isonicotinic acid hydrazide for the dihydrate, but no free isonicotinic acid hydrazide.

The above compound was converted back to glucuronolactone isonicotinyl hydrazone. The salt (2.0 g.) was dissolved in 3 ml. of water. To this solution was added 6.7 ml. of 1.01 N HCl. The resulting pH was about 4. Absolute ethanol (5 ml.) was added. Crystallization occurred overnight at room temperature. After storage at 4° C. for a few hours, the crystals were filtered off, washed with cold absolute ethanol, and dried. The resulting product consisted of microscopic white platelets, decomposing with the evolution of gas at 174° C.–176° C. (uncorrected), a value identical with that of authentic d-glucuronolactone isonicotinyl hydrazone determined under precisely the same conditions.

*Example 6*

The following is a large-scale method that has been used for preparing sodium glucuronate isonicotinyl hydrazone dihydrate:

Start with pure glucuronolactone isonicotinyl hydrazone. If old or colored, it should be recrystallized. This is easily accomplished by dissolving 70 g. of the hydrazone in 3 l. of boiling methanol. Add a decolorizing agent, such as 5 teaspoons of Norit A, and boil 7 minutes. Filter the hot solution by gravity, cool the filtrate rapidly in water, and allow to crystallize overnight at 4° C. Filter with suction, wash with a small quantity of cold methanol, and dry in a vacuum desiccator.

To any convenient quantity of ice-cold 2.0 N NaOH, in a beaker surrounded by an ice bath, rapidly stir in the stoichiometric amount of glucuronolactone isonicotinyl hydrazone. Do not let the temperature rise above 15° C. during the addition.

Dissolve all particles with stirring, allowing the mixture to come to room temperature if necessary. The final pH should be 7.5 to 8.0.

Add a volume of methanol equal to the volume of the solution, mix well, seed the solution and store at minus 20° C., with occasional mixing or shaking. After at least 24 hours, filter with suction on a large Buchner funnel covered with a rubber dam. Wash the cake with a minimum amount of 70% methanol (ice-cold). Replace the dam and suck out most of the liquid. Dry first in a vacuum, then over $CaCl_2$. Grind the product in a mortar to pass through a 40-mesh sieve.

This process leads, with good yield, to a very light yellow product with the correct analysis and with an acute LD–50 in mice, intraperitoneally, of 8.0 g./kg. of body weight.

*Example 7*

Another isonicotinyl hydrazone prepared from a uronic acid is d-galacturonic acid isonicotinyl hydrazone,

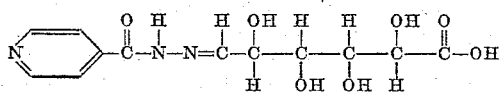

also a new compound that is highly active against *Mycobacterium tuberculosis* and comparatively much less toxic than isonicotinic acid hydrazide. This compound has been prepared as follows:

In an Erlenmeyer flask of 1-liter capacity, 16.7 g. of isonicotinic acid hydrazide were dissolved in 170 cc. of methyl alcohol (acetone-free) by heating on the steam bath. To the hot solution 25 g. of d-galacturonic acid, dissolved in 150 cc. of hot distilled water, were added. The reactants were thoroughly mixed by shaking and the flask heated on the steam bath for 10 minutes. A crystalline precipitate (white platelets) was seen to form even when the solution was boiling hot. After 24 hours of standing at room temperature, the crystalline product was filtered off with suction, washed first with a small amount of ice-cold distilled water and then with a small amount of methyl alcohol, and finally sucked to dryness. The product was placed in a vacuum desiccator of anhydrous $CaCl_2$ where it was dried for 3 days. The weight of the resultant crystalline product was 40.5 g. (92% of the theoretical yield). On heating, it charred and decomposed between 212° C. and 214° C.

In contrast to d-glucuronolactone isonicotinyl hydrazone, which could not be recrystallized from an aqueous medium, d-galacturonic acid isonicotinyl hydrazone was readily purified by recrystallization from boiling water in the presence of a small amount of decolorizing charcoal. From analytical data, however, it is apparent that the original product is almost as pure as the recrystallized. There is no appreciable difference in physical properties. The new compound is also freely soluble in dilute $NaHCO_3$, NaOH, and HCl. In sodium bicarbonate solution it may be used for injection in animals either intravenously or intraperitoneally.

*Example 8*

D-galacturonic acid isonicotinyl hydrazone has also been prepared as follows, using water as the solvent:

D-galacturonic acid (100 g.) was dissolved in distilled water (500 ml.). Isonicotinic acid hydrazide (65 g.) was also dissolved, separately, in the same solvent (250 ml.) by warming on a steam bath. The hot d-galacturonic acid solution was filtered and added to the isonicotinic acid hydrazide solution. The solutions were thoroughly mixed by shaking and then heated on the steam bath for 10 minutes. White crystals started to separate even while the solution was still hot. The mixture was allowed to stand for 24 hours at room temperature. The crystals (white plates and rods) were filtered with suction, washed with a small amount of ice-cold distilled water, and then with methanol. Suction was continued to remove any moisture. The product was further dried in a vacuum desiccator over anhydrous calcium chloride for 24 hours. Weight: 124 g. The hydrazone melted at 207° C.–208° C. (uncorrected), or 211° C.–212° C. (corrected), with charring and decomposition.

*Example 9*

A convenient and consistent method has been developed for routinely producing d-galacturonic acid isonicotinyl hydrazone in good yield and adequate purity. This procedure is as follows:

Dissolve 155 g. (.75 mol.) d-galacturonic acid monohydrate in 900 ml. distilled water warmed to 80° C. Add a decolorizing agent, such as 50 g. of Norit A, stir for 5 minutes, and filter. Dissolve 100 g. (.73 mol.) isonicotinic acid hydrazide in 1020 ml. boiling methanol contained in a 3 or 4-liter beaker. Add the aqueous solution, the temperature of which should be about 60° C., with stirring. The resulting solution, at a temperature of 55° C. to 65° C., should remain completely clear for a few seconds, until crystallization of the product begins. Allow the mixture to cool for 1 hour at room temperature, then store overnight at 4° C. Filter the product with suction and wash it on the funnel, first with water, then with methanol. Remove most of the solvent with suction and finish drying in the vacuum desiccator. Yield, 90%. The product decomposes at 199° C. (corrected).

*Example 10*

D-galacturonic acid isonicotinyl hydrazone was prepared from sodium calcium galacturonate and isonicotinic acid hydrazide in the following manner:

Sodium calcium galacturonate (17 g.) was dissolved in 90 ml. of 0.78 N hydrochloric acid with warming. Norit A (5 g.) was added, and the solution was stirred for 2 minutes at 60° C. It was then filtered on a Buchner funnel to give a colorless solution. To this solution was added, with stirring, a solution of 10 g. of isonicotinic acid hydrazide in 50 ml. of hot water. Within 1 minute a copious, white, crystalline precipitate came down. The mixture was allowed to stand overnight at room temperature, then filtered, washed with ice-cold water, and dried in a vacuum desiccator. Yield, 70%.

*Example 11*

D-galacturonic acid isonicotinyl hydrazone was prepared from calcium galacturonate and isonicotinic acid hydrazide as follows:

Calcium galacturonate (17 g.) was dissolved in 90 ml. of 0.81 N hydrochloric acid. The colorless solution contained some white solid residue, so the solution was filtered. To the filtrate was added, with stirring, a hot solution of 10 g. of isonicotinic acid hydrazide in 50 ml. of water. After about 1 minute, a copious white precipitate appeared. The system was allowed to stand overnight at room temperature. On the next day, the crystals were filtered off, washed with water and then with methanol, and sucked dry. Drying was finished in a vacuum desiccator. Yield, 88.6%.

*Example 12*

Sodium d-galacturonate isonicotinyl hydrazone was prepared from d-galacturonic acid isonicotinyl hydrazone in the following manner:

The acid hydrazone (6.2 g.) was suspended in 30 ml. water. Sodium hydroxide (3.3 ml. of 6.0 N) was added slowly, with shaking. Almost all the solid went into solution. Absolute methanol (100 ml.) was added, and the solution heated to 70° C. The one-phase solution was allowed to cool until crystals began to form, then stored at 4° C. overnight. The crystals were removed by filtration, washed with methanol, and dried in a vacuum desiccator.

*Example 13*

Sodium d-galacturonate isonicotinyl hydrazone has also been prepared from d-galacturonic acid isonicotinyl hydrazone using sodium carbonate as the neutralizing agent. The acid hydrazone (6.2 g.) was suspended in 15 ml. water. Sodium carbonate (1.06 g.) was added. All of the solid went into solution with gentle heat. Absolute methanol (100 ml.) was added at 70° C. The one-phase solution was set aside for crystallization. On the next day the crystals were filtered off, washed with methanol, and dried in a vacuum desiccator.

*Example 14*

Another isonicotinyl hydrazone prepared from a uronic acid-derived lactone is d-mannuronolactone isonicotinyl hydrazone

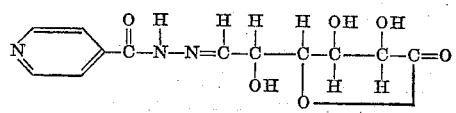

also a new compound with comparatively low toxicity and very high antitubercular activity. This compound has been prepared in the following manner:

On a steam bath, 17.5 g. of d-mannuronolactone were boiled with a mixture of 350 cc. of methanol and 150 cc. of distilled water until a clear solution resulted. To this solution 14 g. of isonicotinic acid hydrazine were added, all at once, and the mixture boiled continually for 10 minutes on a steam bath. The resulting clear solution was filtered, while hot, through a piece of lens paper into a 500 cc. Erlenmeyer flask and allowed to stand. After 24 hours, crystals in the form of fine white needles were observed and were filtered off with suction, washed with a small amount of ice-cold methyl alcohol, and sucked to dryness. The product was further dried in a vacuum desiccator for 24 hours. The total yield was 24.8 g. (85% of theoretical yield).

The pure crystals of d-mannuronolactone isonicotinyl hydrazone melted between 150° C. and 175° C., with foaming and decomposition. This compound may also be further purified by recrystallization from 75% methanol.

It is a notable feature of the new isonicotinyl hydrazones, just described, that each may be produced from a uronic acid, its salt, or its lactone, that is readily available and easily manufactured. In particular, d-galacturonic acid may be prepared from waste products such as orange or other citrus fruit peels. Of the lactones, d-mannuronolactone is prepared by hydrolysis of alginic acid from seaweed, while d-glucuronolactone may be produced from glucose, particularly by-product glucose from starch manufacture. It is significant that the latter is also a metabolite; e.g., a composition normally occurring in warm-blooded animals.

It will be apparent to those skilled in the art to which this invention relates that widely differing procedures and applications of the invention, as well as some variation in the spatial reltionships of the chemical structures, will suggest themselves without departing from the spirit and scope of the invention. The disclosures and examples herein are purely illustrative and are not intended to be in any sense limiting.

For example, a skilled chemist is aware that the water can be omitted from the alcoholic medium, where it is desired to prevent hydrolysis or hydration or for other reasons. With hydrolyzable compounds and where hydrolysis is desired the omission of alcohol is the obvious expedient (cf. Example 8). Similarly, it will be recognized from the foregoing that methanol and ethanol are generally equivalent lower aliphatic alcohols. There is no need to specify each detail that is feasible in the method.

The essential feature of this invention, however, is the production of new isonicotinyl hydrazones and their salts from uronic acids, their salts and their lactones, which have substantial antitubercular activity yet which are comparatively much less toxic than the free hydrazide drug, isonicotinic acid hydrazide.

What is claimed is:

1. A process for the preparation of a chemical compound having anti-tuberculosis activity comprising reacting a molecular equivalent of isonicotinic acid hydrazide with a substantially molecular equivalent of a compound selected from the group consisting of glucuronolactone, galacturonic acid, and mannuronolactone, in a hot, inert solvent medium.

2. The process for the preparation of d-glucuronolactone isonicotinyl hydrazone which comprises reacting, in a boiling inert solvent medium selected from the group consisting of methyl alcohol and aqueous methyl alcohol, substantially equimolecular amounts of d-glucuronolactone and isonicotinic acid hydrazide to form a compound corresponding to the formula

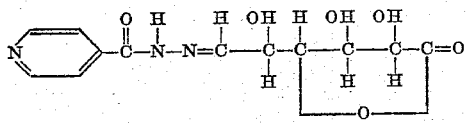

3. The process for the preparation of d-glucuronolactone isonicotinyl hydrazone which comprises reacting concentrated hydrochloric acid with sodium d-glucuronate to form a compound corresponding to the formula

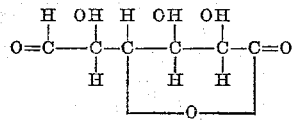

and reacting, in a boiling, inert solvent medium selected from the group consisting of methyl alcohol and aqueous methyl alcohol, the latter compound with a substantially equimolecular amount of isonicotinic acid hydrazide to form a compound corresponding to the formula

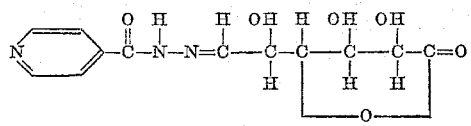

4. The process for the preparation of d-galacturonic acid isonicotinyl hydrazone which comprises reacting, in a hot, inert solvent medium selected from the group consisting of water and aqueous methanol, substantially equimolecular amounts of d-galacturonic acid and isonicotinic acid hydrazide to form a compound corresponding to the formula

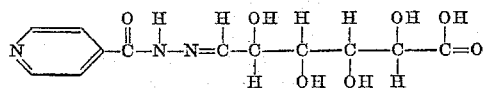

5. The process for the preparation of d-galacturonic acid isonicotinyl hydrazone which comprises dissolving in hydrochloric acid, a salt of galacturonic acid selected from the group consisting of sodium and sodium-calcium, and adding thereto a hot solution, in an inert solvent selected from the group consisting of water and aqueous methanol, of a substantially equimolecular amount of isonicotinic acid hydrazide to form a compound corresponding to the formula

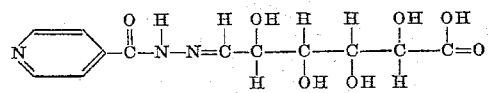

6. The process for the preparation of d-mannuronolactone isonicotinyl hydrazone which comprises reacting, in a boiling aqueous methanol medium, substantially equimolecular amounts of d-mannuronolactone and isonicotinic acid hydrazide to form a compound corresponding to the formula

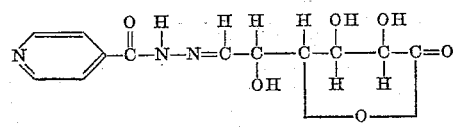

References Cited in the file of this patent

UNITED STATES PATENTS

| | | |
|---|---|---|
| 2,685,580 | Fox | Aug. 3, 1954 |
| 2,704,754 | Losee et al. | Mar. 22, 1955 |
| 2,712,021 | Tanenbaum | June 28, 1955 |

OTHER REFERENCES

Noller: Chemistry of Organic Compounds, 1st ed., W. B. Saunders Co., Philadelphia, pages 358-359, 368 (1951).

Yale et al.: J. Am. Chem. Soc., vol. 75, pages 1933-1942 (1953).